March 28, 1961    T. J. BROOKS    2,977,162
MECHANICAL DEVICE
Filed May 5, 1958

INVENTOR.
THEODORE J. BROOKS
BY
Woodhams Blanchard and Flynn
ATTORNEYS

United States Patent Office 2,977,162
Patented Mar. 28, 1961

2,977,162

MECHANICAL DEVICE

Theodore J. Brooks, Kalamazoo, Mich., assignor to Pemco Wheel Company, Kalamazoo, Mich., a corporation of Michigan Filed May 5, 1958, Ser. No. 733,197

2 Claims. (Cl. 308—193)

This invention relates to a bearing construction and it relates particularly to a bearing construction utilizing at least two axially spaced sets of bearing balls having lubricant supply means therebetween, which construction can be assembled extremely rapidly but which will be strong, rigid and durable in use.

In the design of self-contained bearing units, it has long been desired to provide a bearing unit which can be built rapidly and at a minimum of cost but which when completed will be strong, rigid and durable in use. Further, it is desired to provide such a bearing unit which can be lubricated from a point internally thereof and which can be effectively shielded to prevent entry of grit, dirt and other foreign material into the moving parts of the bearing unit. While many bearing constructions have been offered with these objectives in view, in a constant effort to improve bearing constructions, a design has been devised which is believed to more completely meet the above mentioned objectives than do known bearing constructions.

Accordingly, the objects of the invention include the following:

(1) To provide a self-contained bearing construction which can be manufactured at extremely low cost;

(2) To provide a bearing construction, as aforesaid, which when assembled will have a high degree of structural strength and durability;

(3) To provide a bearing construction, as aforesaid, which can be lubricated conveniently by passing a lubricant through the shaft with which the bearing unit is associated;

(4) To provide a bearing construction, as aforesaid, in which the hardened, wear-resistant parts are separate from the parts requiring manipulation, including cutting and bending, during the assembly procedure, thereby minimizing assembly problems and cost; and (5) To provide a bearing construction, as aforesaid, which when completed will have a long life and will be capable of carrying substantial loads.

Other objects and purposes of the invention will be apparent to persons acquainted with devices of this general type upon reading the following description and inspecting the accompanying drawings.

Figure 1:
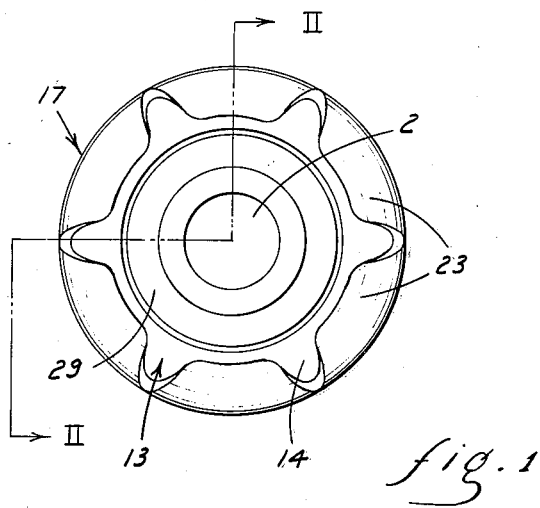
Figure 1 is an end view of a bearing construction embodying the invention.
Figure 2:
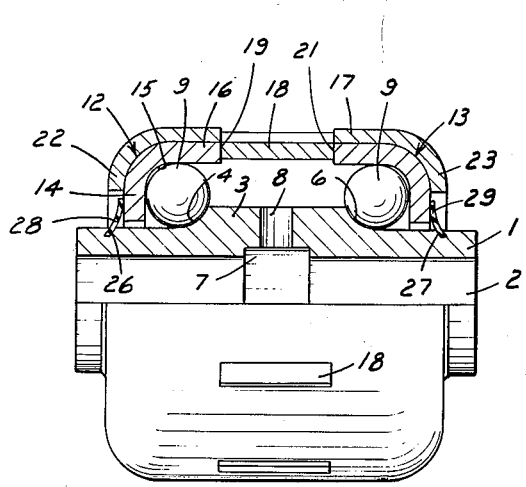
Figure 2 is a view, partially in central cross section, taken along the line II—II in Figure 1.

Referring now to the drawings, a spindle 1 has a central opening 2 and has a central portion 3 of enlarged external diameter intermediate its ends. The axial ends of the central portion 3 are curved through slightly less than a 90 degree arc to define bearing cones 4 and 6. A lubricant distribution groove 7 is formed in the interior wall of the central portion 3 intermediate the bearing cones 4 and 6 and a plurality of lubricant distribution openings, of which one appears at 8, extend radially outwardly therefrom. Two axially spaced sets of bearing balls 9 are arranged around the spindle and ride, respectively, against the cones 4 and 6. Hardened, wear resistant races 12 and 13 surround the spindle and are spaced axially from the bearing cones 4 and 6, respectively. The races 12 and 13 are of generally angle cross section and have a radially extending portion 14 connected by a curved portion 15 of approximately 90 degree arc to an axially extending portion 16. The curved portions 15 of the races 12 and 13 are opposed to the bearing cones 4 and 6 and the balls are retained in position therebetween and ride thereon.

A casing 17 surrounds the races 12 and 13 and has a series of circumferentially spaced, radially inwardly extending projections, one of which is indicated at 18, located midway between the axial ends thereof. The casing is here shown as being formed from sheet stock formed to define a substantially cylindrical shape but it may be made from seamless tubing if desired. The projections may be formed in any suitable fashion, such as by punching portions of the casing 17 inwardly. The ends of projections 18 engage the opposed edges 19 and 21 of the races 12 and 13 for holding them properly spaced apart. It will be apparent that the spacing projections 18 may be provided in other ways such as that disclosed in the copending application of J. W. Black, Jr., Serial No. 619,839, which issued on December 30, 1958 as Patent No. 2,866,672 and is assigned to the assignee of the present application. The opposite ends of the casing 17 are provided with a series of circumferentially spaced, radially inwardly turned tabs 22 and 23. The tabs 22 and 23 engage the outer surfaces of the radially extending portions 14 of races 12 and 13 for holding the whole assembly together.

Grooves 26 and 27 are provided adjacent the opposite ends of the spindle 1. Annular sealing discs 28 and 29 are disposed in the grooves 26 and 27, respectively. The central openings of the sealing discs are of smaller diameter than the diameter of the grooves 26 and 27 so that the rings must be stretched to be seated in the grooves whereby said discs are retained in said grooves under tension and are distorted into the dished shape shown to cause the peripheral portions of the discs 28 and 29 to bear against the axially outward surfaces of the radially extending portions 14 of the races 12 and 13, respectively. Further details of this type of sealing disc structure appear in the patent of J. W. Black, Jr., No. 2,818,302, assigned to the assignee of the present application.

It will be appreciated that the described structure can be assembled rapidly using relatively simple equipment. The casing 17 may be initially in the shape of a cylinder having somewhat scalloped end edges and having the spacing projections 18 formed therein. With the spindle 1 and casing 17 properly positioned with respect to each other, the bearing unit may be assembled by placing a set of bearing balls 9 against one of the cones, inserting the race within the casing until it abuts against projections 18 and then turning the tabs on that end of the casing inwardly to hold the race and bearing balls in place. The other set of bearing balls and the race are assembled in similar fashion. Since the races 12 and 13 are held in proper spaced position with respect to each other and the bearing cones, the balls will be held in position and will neither bind nor be improperly loose.

A lubricant, such as grease, may be inserted into the bearing unit through the opening 8 in any convenient manner. For example, where the spindle is mounted upon a shaft the shaft may have an axially extending lubricant opening therethrough communicating with the groove 8.

While a particular, preferred embodiment of the invention has been described, the invention contemplates such changes or modifications therein as lie within the scope of the appended claims.

What is claimed is:

1. A bearing assembly, comprising: an elongated, cylindrical spindle having a cylindrical, coaxial opening therethrough, said spindle having an annular central portion of enlarged diameter, the opposite axial ends of said central portion defining a pair of coaxial inner races having concave surfaces; means defining a concentric, annular recess in the wall defining said coaxial opening through said spindle, and a plurality of radially disposed lubrication openings communicating with said annular recess and extending through the outer surface of said central portion between said inner races; a substantially cylindrical casing concentrically encircling and radially spaced from said spindle, said casing having radially inwardly extending flanges at the opposite axial ends thereof, said flanges being radially spaced from said spindle and axially spaced inwardly from the adjacent ends thereof; means defining a plurality of circumferentially spaced, elongated and parallel projections extending inwardly from said casing and arranged in circumferential alignment, said projections having flat end surfaces lying within a pair of spaced, parallel planes perpendicular to the axis of said spindle; a pair of similar annular members coaxially and rigidly held within the opposite ends of said casing and radially spaced from said spindle, each annular member having a substantially cylindrical outer portion having flat radial surfaces respectively abutting said end surfaces and said annular members being snugly held between the radial flanges at one end of said casing and the adjacent ends of said projections, and each annular member having a flat radial portion abutting said radial flanges and encircling said spindle, said cylindrical and radial portions being curved into each other to define concave outer races opposite said inner races; a plurality of bearing balls snugly and rollably disposed between the corresponding inner and outer races whereby the closing of the ends of the casing respectively against said annular members will urge them tightly against the ends of said projections.

2. A bearing assembly, comprising: an elongated, cylindrical spindle having a cylindrical, coaxial opening therethrough, said spindle having an annular central portion of enlarged diameter, the opposite axial ends of said central portion defining a pair of coaxial inner races having concave surfaces; means defining a concentric, annular recess in the wall defining said coaxial opening through said spindle, and a plurality of radially disposed lubrication openings communicating with said annular recess and extending through the outer surface of said central portion between said inner races; a substantially cylindrical casing concentrically encircling and radially spaced from said spindle, said casing having radially inwardly extending flanges at the opposite axial ends thereof, said flanges being radially spaced from said spindle and axially spaced inwardly from the adjacent ends thereof; means defining a plurality of circumferentially spaced, elongated and parallel projections extending inwardly from said casing and arranged in circumferential alignment, said projections having flat end surfaces lying within a pair of spaced, parallel planes perpendicular to the axis of said spindle; a pair of similar annular members coaxially and rigidly held within the opposite ends of said casing and radially spaced from said spindle, each annular member having a substantially cylindrical outer portion having flat radial surfaces respectively abutting said end surfaces and said annular members being snugly held between the radial flanges at one end of said casing and the adjacent ends of said projections, and each annular member having a flat radial portion abutting said radial flanges and encircling said spindle, said cylindrical and radial portions being curved into each other to define concave outer races opposite said inner races; a plurality of bearing balls snugly and rollably disposed between the corresponding inner and outer races whereby the closing of the ends of the casing respectively against said annular members will urge them tightly against the ends of said projections; means defining a pair of annular concentric grooves in the outer surfaces of said spindle adjacent said radial flanges; a pair of sealing rings having smaller inside diameters than said annular grooves, said rings being resiliently flexible and substantially flat in their unassembled positions, one of said rings being disposed within each of said grooves whereby the peripheral portion of each ring is urged against and slidably engages the radial portion of the adjacent annular member.

References Cited in the file of this patent

UNITED STATES PATENTS

| | | |
|---|---|---|
| 1,262,681 | Laycock | Apr. 16, 1918 |
| 2,152,685 | Grange et al. | Apr. 4, 1939 |
| 2,712,966 | Brady et al. | July 12, 1955 |
| 2,818,302 | Black | Dec. 31, 1957 |